US012756193B2

(12) United States Patent
Kirchner et al.

(10) Patent No.: US 12,756,193 B2
(45) Date of Patent: Oct. 6, 2026

(54) METHOD AND DEVICE FOR CHANGING A TRANSFORMATION RATIO, AN IMPEDANCE, OR A VOLTAGE USED FOR EXCITATION

(71) Applicant: Maschinenfabrik Reinhausen GmbH, Regensburg (DE)

(72) Inventors: Laurenc Kirchner, Regensburg (DE); Karsten Viereck, Regensburg (DE); Sebastian Rehkopf, Regensburg (DE)

(73) Assignee: REINHAUSEN GMBH, Regensburg (DE)

( * ) Notice: Subject to any disclaimer, the term of this patent is extended or adjusted under 35 U.S.C. 154(b) by 144 days.

(21) Appl. No.: 18/864,073

(22) PCT Filed: Apr. 24, 2023

(86) PCT No.: PCT/EP2023/060610
§ 371 (c)(1),
(2) Date: Nov. 8, 2024

(87) PCT Pub. No.: WO2023/217517
PCT Pub. Date: Nov. 16, 2023

(65) Prior Publication Data

US 2025/0330018 A1 Oct. 23, 2025

(30) Foreign Application Priority Data

May 11, 2022 (DE) ..................... 10 2022 111 762.2

(51) Int. Cl.
*H02J 3/12* (2026.01)
*H01F 29/04* (2006.01)
*H02J 3/1878* (2026.01)

(52) U.S. Cl.
CPC ................ *H02J 3/12* (2013.01); *H01F 29/04* (2013.01); *H02J 3/1878* (2013.01)

(58) Field of Classification Search
CPC ............ H02J 3/12; H02J 3/1878; H01F 29/04
See application file for complete search history.

(56) References Cited

U.S. PATENT DOCUMENTS 5,166,597 A 11/1992 Larsen et al.
5,408,171 A 4/1995 Eitzmann et al.
(Continued)

FOREIGN PATENT DOCUMENTS

DE 4437143 C1 12/1995
DE 102014106322 A1 11/2015
WO WO 2012079666 A2 6/2012

*Primary Examiner* — Rafael O De Leon Domenech
(74) *Attorney, Agent, or Firm* — LEYDIG, VOIT & MAYER, LTD.

(57) ABSTRACT

A method changes a transformation ratio, an impedance, or a voltage used for excitation of an item of electrical equipment. The item of electrical equipment includes: a tap winding having winding taps and a partial winding; and a tap changer that changes the transformation ratio, impedance, or voltage used for excitation. The tap changer has a first module that connects the winding taps to one another; and a second module with semiconductor switching elements for the switching-in, switching-out or bypassing of the partial winding. The method includes: receiving a request to change the transformation ratio, the impedance, or the voltage; checking a relevant parameter; and changing the transformation ratio, the impedance, or the voltage either by way of the first module or by way of the second module depending on the check of the at least one relevant parameter.

14 Claims, 8 Drawing Sheets

(56) References Cited

U.S. PATENT DOCUMENTS

| | | | | |
|---|---|---|---|---|
| 8,598,836 | B1 * | 12/2013 | Rabinovich | H02P 3/18<br>318/771 |
| 2013/0249528 | A1 | 9/2013 | Biskoping et al. | |
| 2014/0077913 | A1 * | 3/2014 | Weber | H01H 9/0005<br>336/170 |
| 2015/0268677 | A1 | 9/2015 | Clark | |
| 2016/0231756 | A1 | 8/2016 | Baerthlein et al. | |
| 2019/0199098 | A1 | 6/2019 | Shah et al. | |
| 2021/0013719 | A1 * | 1/2021 | Braun | H02J 3/32 |
| 2022/0308605 | A1 * | 9/2022 | Rebollo López | G05F 1/14 |

* cited by examiner

METHOD AND DEVICE FOR CHANGING A TRANSFORMATION RATIO, AN IMPEDANCE, OR A VOLTAGE USED FOR EXCITATION

CROSS REFERENCE TO RELATED APPLICATIONS

This application is a U.S. National Phase application under 35 U.S.C. § 371 of International Application No. PCT/EP2023/060610, filed on Apr. 24, 2023, and claims benefit to German Patent Application No. DE 10 2022 111 762.6, filed on May 11, 2022. The International Application was published in German on Nov. 16, 2023 as WO 2023/217517 A1 under PCT Article 21(2).

FIELD

The present disclosure relates to a method for changing a transformation ratio, an impedance or a voltage, used for excitation, of an item of electrical equipment, and to a device for changing a transformation ratio, an impedance or a voltage, used for excitation, of an item of electrical equipment.

BACKGROUND

When regulating energy supply networks, a distinction is made between two different time ranges. In what is known as the steady-state range, suitable equipment is used to set a static operating point in an energy supply network, which enables reliable operation of the network with low fluctuations in load and infeed. The regulation is carried out here in cycles of one minute. In the dynamic range, suitable equipment is used to react to dynamic fluctuations in the network, which may be caused for example by faults or rapid and possibly only temporary changes in the infeed and load situation. In this case, very fast regulation in the range of milliseconds is necessary in order to keep the network stable.

Since the demand for reactive power also changes alongside the respective infeed and load situation, reactive power regulation is an essential component of reliable, efficient and minimal-loss network management.

Suitable equipment is already known both for network regulation in the steady-state range and for dynamic voltage regulation. By way of example, regulated transformers, phase shifters or regulated shunt reactors are thus used to regulate static network operation. Static synchronous compensators (STATCOM) or static reactive power compensators (SVC) are used to carry out regulation in the event of dynamic network behavior, for example.

The present inventors have recognized that equipment used to carry out regulation in the dynamic range will become increasingly relevant in the foreseeable future for reliable network management on account of the energy revolution and the integration of decentralized energy generation into network operation, since the infeed achieved through renewable energies is less predictable.

In addition to regulating energy supply networks, the present inventors have recognized that, the different time ranges mentioned above also play an essential role in the energy supply of electric arc furnaces. Appropriate furnace transformers for supplying power to electric arc furnaces generally contain tap changers that make it possible to regulate the power of the furnace transformer in the range of a few seconds to minutes. However, due to rapidly changing operating conditions in electric arc furnaces, such as for example the breaking of the arcs used for melting, undesirable network perturbations, such as for example flicker, with time constants in the millisecond range, often occur in electric arc furnaces. To limit these network perturbations, use is made of compensation installations (SVC), which are usually likewise complex and expensive.

An item of equipment that makes it possible to carry out regulation both in the steady-state range or the second-to-minute range and in the dynamic or millisecond range in combination has not yet to date been disclosed in the prior art.

SUMMARY

In an embodiment, the present disclosure provides a method that changes a transformation ratio, an impedance, or a voltage used for excitation of an item of electrical equipment. The item of electrical equipment includes: a tap winding having winding taps and a partial winding; and a tap changer that changes the transformation ratio, impedance, or voltage used for excitation. The tap changer has a first module that connects the winding taps to one another; and a second module with semiconductor switching elements for the switching-in, switching-out or bypassing of the partial winding. The method includes: receiving a request to change the transformation ratio, the impedance, or the voltage; checking a relevant parameter; and changing the transformation ratio, the impedance, or the voltage either by way of the first module or by way of the second module depending on the check of the at least one relevant parameter.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
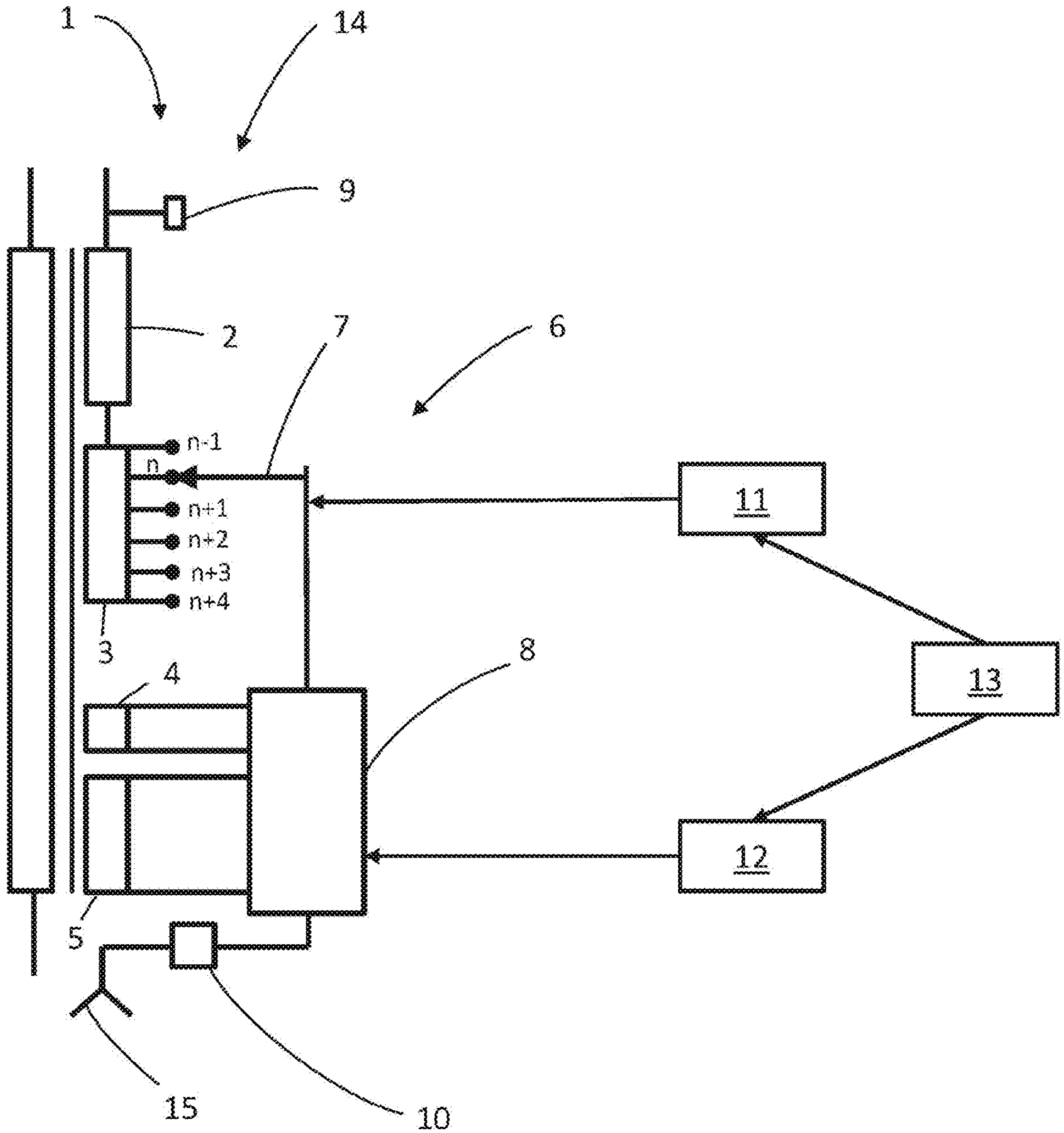
FIG. 1 shows a schematic illustration of a first embodiment of a device according to the improved concept.

Aspects of the present disclosure provide an improved concept for regulating energy supply networks or energy supply installations that provides a combined, flexible regulation solution for serving both time ranges, and which is also inexpensive, space-saving and exhibits low losses during operation and in production.

Aspects of the improved concept are based on the idea of combining a conventional tap changer, as is sufficiently known in the art, with a power-electronics tap changer located in series therewith. Since the power-electronics tap changer is able to change its switching position quickly, namely in the millisecond range, and in the process adopt any position, this makes it possible to adapt the voltage quickly to rapidly changing load conditions. The conventional tap changer is used to serve the steady-state range, covering the widest possible regulating range. This makes it possible to achieve a high degree of flexibility in terms of network management and also installation and process management.

According to a first aspect of the improved concept, what is provided is a method for changing a transformation ratio, an impedance or a voltage, used for excitation, of an item of electrical equipment. The item of electrical equipment comprises at least a main winding, a tap winding having winding taps and at least one partial winding. The item of electrical equipment furthermore comprises a tap changer for changing the transformation ratio, the impedance or the voltage, used for excitation, of the item of electrical equipment.

The item of electrical equipment may be designed as a regulated transformer, in particular including as a phase shifter transformer, as a regulated reactor or as a regulated transformer having a capacitor.

The tap changer comprises a first module for connecting the winding taps of the tap winding to one another and a second module having semiconductor switching elements for the rapid switching-in, switching-out or bypassing of the at least one partial winding.

The at least one partial winding has a certain number of turns that is preferably greater than the largest number of turns present between two adjacent winding taps of the tap winding. In the event that the item of electrical equipment has multiple partial windings, then the numbers of turns of the multiple partial windings may be integer multiples of one another.

According to one embodiment, the first module is designed as an on-load tap changer for uninterrupted changeover between different winding taps of the tap winding of the item of electrical equipment and has a selector for the powerless preselection of that winding tap of the item of electrical equipment to which a changeover is to be performed, and a diverter switch for carrying out the actual, uninterrupted changeover from the previously connected winding tap to the new, preselected winding tap. For the powerless preselection of the winding taps, the selector generally has two movable selector contacts that connect the winding taps to one another. The diverter switch usually has switching contacts and resistors for the actual diverter switch operation. The switching contacts are designed for example as vacuum interrupters. The resistors are used to limit the circulating current that flows briefly in the diverter switch during the changeover process and are also referred to as transition resistors.

According to one embodiment, the second module comprises at least one, and in the event that the item of electrical equipment has multiple partial windings, preferably multiple submodules having semiconductor switching elements. Each submodule is assigned at least one partial winding, and each submodule is designed for the rapid switching-in, switching-out or bypassing of the assigned partial winding.

According to a further embodiment, the semiconductor switching elements each comprise an antiparallel-connected thyristor pair or IGBT pair.

The method for changing the transformation ratio, the impedance or the voltage, used for excitation, of the item of electrical equipment has the following steps:

a) receiving a request to change the transformation ratio, the impedance or the voltage, used for excitation, of the item of electrical equipment,
b) checking at least one relevant parameter,
c) changing the transformation ratio, the impedance or the voltage, used for excitation, of the item of electrical equipment either by way of the first module or by way of the second module depending on the check of the at least one relevant parameter.

According to one embodiment, the relevant parameter comprises an absolute value of a deviation of an actual voltage of the item of electrical equipment, for example the voltage on the primary or secondary side of a transformer, from a predefined desired voltage. The transformation ratio is changed by way of the second module when the absolute value of the deviation from the desired voltage is greater than a step voltage present between two adjacent winding taps of the tap winding.

According to this embodiment, the item of electrical equipment is designed as a regulated transformer. The change in the transformation ratio of the transformer, that is to say the adaptation to the required desired voltage on the primary or secondary side of the transformer, is performed using the second module when the absolute value of the voltage to be regulated or the desired voltage change is so great that the change cannot be achieved by actuating the first module.

According to a further embodiment, the relevant parameter comprises an absolute value of a deviation of an impedance of the item of electrical equipment from a predefined desired impedance. The impedance is changed by way of the second module when the absolute value of the deviation from the desired impedance is greater than an impedance acting between two adjacent winding taps of the tap winding.

According to this embodiment, the item of electrical equipment is designed as a regulated reactor. The change in the impedance of the reactor, that is to say the adaptation to the required desired impedance, is performed using the second module when the absolute value of the impedance to be regulated or the desired impedance change is so great that the change cannot be achieved by actuating the first module.

According to a further embodiment, the relevant parameter comprises an absolute value of a deviation of an actual voltage in a first inductive arrangement for exciting a second inductive arrangement from a predefined desired voltage. The actual voltage is measured for example on the primary side of the first inductive arrangement or on the secondary side of the second inductive arrangement. The voltage, used for excitation, of the second inductive arrangement is then set by way of the second module when the absolute value of the deviation from the desired voltage is greater than a step voltage present between two adjacent winding taps of the tap winding.

According to this embodiment, the item of electrical equipment comprises a first inductive arrangement and a second inductive arrangement. The actual voltage in the first inductive arrangement is used to excite the second inductive arrangement, and the power output of the first inductive arrangement is thereby increased.

In this arrangement, an excitation transformer, a first inductive arrangement, is supplemented by a booster transformer, a second inductive arrangement. It is thereby possible to set the operating parameters of the tap changer, current and voltage, more flexibly, in particular in the case of high-power units.

The voltage used to excite the booster transformer is thus set here by way of the second module when the absolute value of the desired voltage for exciting the booster transformer is so great that the change cannot be achieved by actuating the first module.

According to one implementation form of this embodiment, the item of electrical equipment may be designed as a phase shifter and the first inductive arrangement may be designed as an excitation transformer and the second inductive arrangement may be designed as a booster transformer. The method may accordingly also be applied analogously to the operation of a phase shifter transformer.

According to a further embodiment, the relevant parameter comprises the gradient of a required voltage change. The transformation ratio is changed by way of the second module when the gradient of the required voltage change is greater than a defined limit value.

According to this embodiment, the item of electrical equipment is designed as a regulated transformer. The change in the transformation ratio of the transformer, that is to say the adaptation to the required desired voltage on the primary or secondary side of the transformer, is performed using the second module when the gradient of the required voltage change is so high, for example a required speed of change of the voltage in the millisecond range, that a change in the transformation ratio would not be able to be carried out quickly enough using the first module. The defined limit value is accordingly one second, for example.

According to a further embodiment, the relevant parameter comprises the gradient of a required impedance change. The impedance is changed by way of the second module when the gradient of the required impedance change is greater than a defined limit value.

According to this embodiment, the item of electrical equipment is designed as a regulated reactor. The change in the impedance of the reactor, that is to say the adaptation to the required desired impedance, is performed using the second module when the gradient of the required impedance change is so high, for example a required speed of change of the impedance in the millisecond range, that a change in the impedance would not be able to be carried out quickly enough using the first module. The defined limit value is accordingly one second, for example.

According to a further embodiment, the relevant parameter comprises a fundamental plus a harmonic content of a voltage present at the item of electrical equipment. The transformation ratio is changed by way of the second module when the harmonic content is greater than a defined limit value.

According to this embodiment, the item of electrical equipment is designed as a regulated transformer. The change in the transformation ratio of the transformer, that is to say the adaptation to the required desired voltage on the primary or secondary side of the transformer, is performed using the second module when the harmonic content above the fundamental of the voltage present at the transformer is so great that the harmonics are no longer able to be eliminated using the first module. The definition of the limit value depends on the respective installation configuration and the network connection conditions.

According to a further embodiment, a Fourier analysis is performed in order to determine the harmonic content above the fundamental of the voltage present at the item of electrical equipment, preferably the voltage present on the network connection side of the item of electrical equipment.

According to a further embodiment, following a change in the transformation ratio, the impedance or the voltage used for excitation by way of the second module, the first and second module are actuated such that the second module adopts a neutral position in which the at least one partial winding is bridged. Bridged means kept at potential but not carrying a current. The semiconductor switching elements of the second module are interconnected with one another so as to form a bypass for the at least one partial winding.

According to one embodiment, the first and second module are actuated alternately here.

According to a further embodiment, the first and second module are actuated alternately until the first module has reached a position indicating a new, static operating point of the energy supply network, and the second module is in the neutral position.

Following switching of the second module, the first module is gradually tightened by setting the winding ratio through a changeover between the winding taps of the tap winding using the first module and in the process accordingly switching off the at least one partial winding through gradual actuation of the semiconductor switching elements of the second module. Ultimately, the tap changer is then in a position in which the first module has returned to the new static operating point and the second module is in the neutral position.

One advantage of this embodiment is that the tap changer is then back in a starting position in which the at least one partial winding no longer carries a current, and the full regulating range is available to the second module again in both directions starting from the neutral position.

According to a further embodiment, following a change in the transformation ratio, the impedance or the voltage used for excitation by way of the second module, the first module and the second module are actuated such that the second module adopts a first end position from which the entire dynamic regulating range of the second module is available from the first end position to a second end position.

By way of example, in the first end position of the second module, the at least one partial winding is switched into the tap winding, that is to say the turns of the partial winding are added to the tap winding, and in the second end position, the partial winding is switched out of the tap winding, that is to say the turns of the partial winding are subtracted from the tap winding.

One advantage of this embodiment is that the entire regulating range of the second module is available for certain network requirements that need a rapid reaction in one direction.

According to a further embodiment, multiple relevant parameters are checked and weighted with regard to their relevance. The transformation ratio, the impedance or the voltage used for excitation are changed either by way of the first module or by way of the second module depending on the check and the weighting of the relevant parameters.

According to one embodiment, the first module and the second module are not actuated at the same time.

According to a second aspect of the improved concept, what is provided is a device for changing a transformation ratio, an impedance or a voltage, used for excitation, of an item of electrical equipment. The device is preferably designed to carry out a method according to the first aspect of the present disclosure.

With regard to the device, reference is analogously made to the previous explanations, preferred features, effects and/or advantages that have already been explained for the method. There is therefore no corresponding repetition.

The item of electrical equipment has at least one main winding, a tap winding having winding taps, at least one partial winding and a tap changer for changing the transformation ratio, the impedance or the voltage, used for excitation, of the item of electrical equipment.

The device comprises at least one sensor for measuring a voltage present at a suitable measuring point and/or at least one sensor for measuring a current flowing at a suitable measuring point.

The device furthermore has an evaluation unit, which is designed to carry out a method according to the first aspect of the improved concept.

According to one embodiment, the tap changer comprises a first module for connecting the winding taps of the tap winding to one another and a second module having semiconductor switching elements for the rapid switching-in, switching-out or bypassing of the at least one partial winding. The first module comprises a first control unit and the second module comprises a second control unit. The evaluation unit is designed to actuate the first control unit and the second control unit.

According to one embodiment, the first module is designed as an on-load tap changer for uninterrupted changeover between the different winding taps of the tap winding of the item of electrical equipment and has a selector for the powerless preselection of that winding tap of the item of electrical equipment to which a changeover is to be performed, and a diverter switch for carrying out the actual, uninterrupted changeover from the previously connected winding tap to the new, preselected winding tap. For the powerless preselection of the winding taps, the selector generally has two movable selector contacts that connect the winding taps to one another. The diverter switch has mechanical switching contacts, for example vacuum interrupters, for the actual diverter switch operation.

According to a further embodiment, the first control unit is designed as a motor drive that actuates the selector contacts and the switching contacts of the on-load tap changer.

According to one embodiment, the second module comprises at least one, and in the event that the item of electrical equipment has multiple partial windings, preferably multiple submodules having semiconductor switching elements. Each submodule is assigned at least one partial winding, and each submodule is designed for the rapid switching-in, switching-out or bypassing of the assigned partial winding.

According to a further embodiment, the second control unit is designed to actuate the at least one or the multiple submodules or their assigned semiconductor switching elements suitably such that the at least one or the multiple partial windings are quickly switched into or switched out of the tap winding or are bypassed.

By way of example, the second control unit is designed as a microcontroller.

The present disclosure is explained below in detail on the basis of exemplary embodiments with reference to the drawings. Components which are identical or functionally identical or which have an identical effect may be provided with identical reference signs. Identical components or components with an identical function are in some cases explained only in relation to the figure in which they first appear. The explanation is not necessarily repeated in the subsequent figures.

FIG. 1 shows a schematic illustration of one advantageous embodiment of a device 1 according to the improved concept.

The device 1 is used to change the transformation ratio of an item of electrical equipment 14, which is designed here as a single-phase regulated transformer. The regulated transformer 14, on the primary or secondary side, has a main winding 2, a tap winding 3 having n winding taps and two partial windings 4 and 5. The partial winding 5 has a higher number of turns than the partial winding 4, for example a number of turns three times higher. In addition, the number of turns of the partial winding 4, and therefore also that of the partial winding 5, is greater than the greatest number of turns present between two adjacent winding taps, for example between n and n+1, of the tap winding 3.

The number of partial windings is not restricted to two. In principle, provision may also be made for multiple partial windings whose number of turns may each be an integer multiple of the partial winding 4.

The transformer 14 furthermore has a tap changer 6 for changing the transformation ratio of the transformer 14. The tap changer 6 comprises a first module 7 for connecting the winding taps n, n+1 of the tap winding 3 to one another and a second module 8, connected in series with the first module 7, for the switching-in, switching-out or bypassing of the partial windings 4, 5. The first module 7 is intended to carry out regulation in the steady-state range, and the second module 8 is intended to carry out regulation in the dynamic time range.

The first module 7 is preferably designed as an on-load tap changer consisting of a selector for the powerless preselection of the winding taps n, n+1 and a diverter switch for uninterrupted changeover from the previously connected winding tap n to the new, preselected winding tap n+1. The on-load tap changer may additionally have a preselector, which may be designed as a coarse tap connection or reversing changeover selector. However, for better clarity, the first module 7 is illustrated in a highly simplified manner in FIG. 1.

The second module 8 preferably has two submodules having semiconductor switching elements, for example anti-parallel-connected thyristor pairs or IGBT pairs. Each submodule is assigned a respective partial winding 4 or 5 and each submodule is designed, by way of the semiconductor switching elements, to switch the respective partial winding 4 or 5 into or out of the tap winding 3 quickly, that is to say within 10 to 1000 milliseconds, or to bypass the respective partial winding 4 or 5 such that the partial winding 4, 5 has a certain potential but does not carry a current. For better clarity, the second module 8 is also illustrated in a highly simplified manner in FIG. 1.

The device 1 additionally has a voltage sensor 9 and a current sensor 10. The voltage sensor 9 is arranged here for example on the high-voltage terminal of the main winding 2 and is designed to measure the item of equipment voltage or actual voltage. The current sensor 10 is arranged between the second module 8 and a load take-off lead 15 and is designed to measure the current flowing between the second module 8 and the load take-off lead 15.

The first module 7 comprises a first control unit 11, which is preferably designed as a motor drive that actuates the selector and the diverter switch mechanically, for example via a drivetrain with a transmission.

The second module 8 is controlled by a second control unit 12. The second control unit 12 is designed to actuate the two submodules or their assigned semiconductor switching elements suitably such that the two partial windings 4 and 5 are quickly connected into or out of the tap winding 3, or are bypassed. The second control unit 12 is designed for example as a microcontroller or as an IGBT driver.

The first control unit 11 and the second control unit 12 are actuated depending on one another by an evaluation unit 13.

Figure 2:
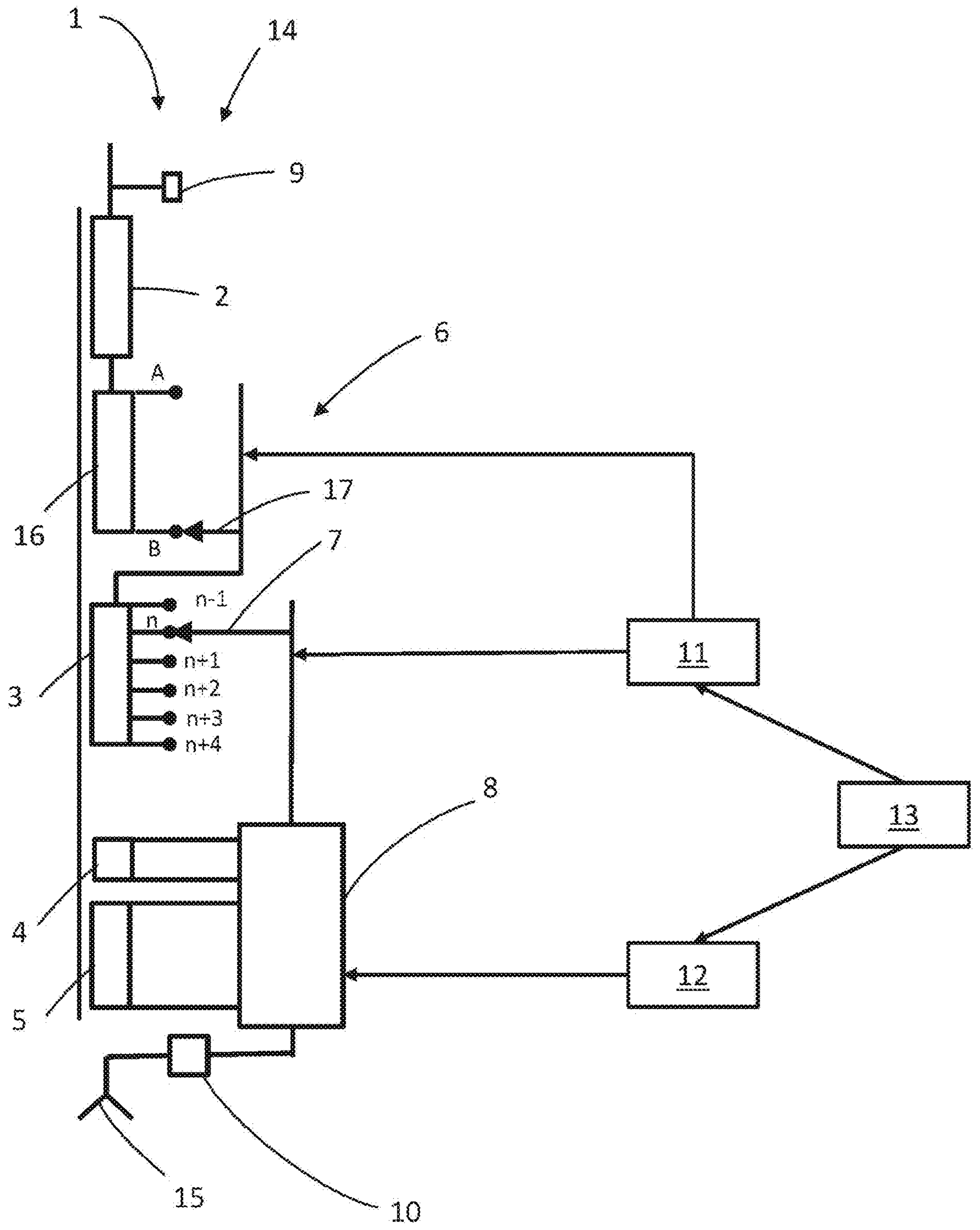
FIG. 2 shows a schematic illustration of a second embodiment of the device.

FIG. 2 schematically illustrates a second embodiment of the device 1 according to the present disclosure. With regard to the device 1 from FIG. 2, reference is analogously made to the above explanations with respect to the device from FIG. 1, and only the differences with respect to the device from FIG. 1 are discussed below.

FIG. 2 shows a device 1 for changing the impedance of an item of electrical equipment 14, which is designed here as a regulated reactor. Such arrangements are used for reactive power regulation in the energy supply network. The regulated reactor 14, in addition to having a main winding 2, a tap winding 3 having n winding taps and two partial windings 4 and 5, additionally has a coarse winding 16 and a coarse tap regulator 17. The coarse tap regulator 17 is able to adopt a first position, in which it makes contact with a first end A of the coarse winding 16, and a second position, in which it makes contact with a second end B of the coarse winding 16. If the coarse tap regulator 17 is in the first position, the coarse winding 16 does not carry a current. If on the other hand the coarse tap regulator 17 is in the second position, the coarse winding 16 carries a current and is consequently added to the main winding 2 and the tap winding 3. The regulating range of the reactor 14 is thereby increased. The device 1 according to this embodiment is used to regulate the consumption of reactive power from the network.

Figure 3:
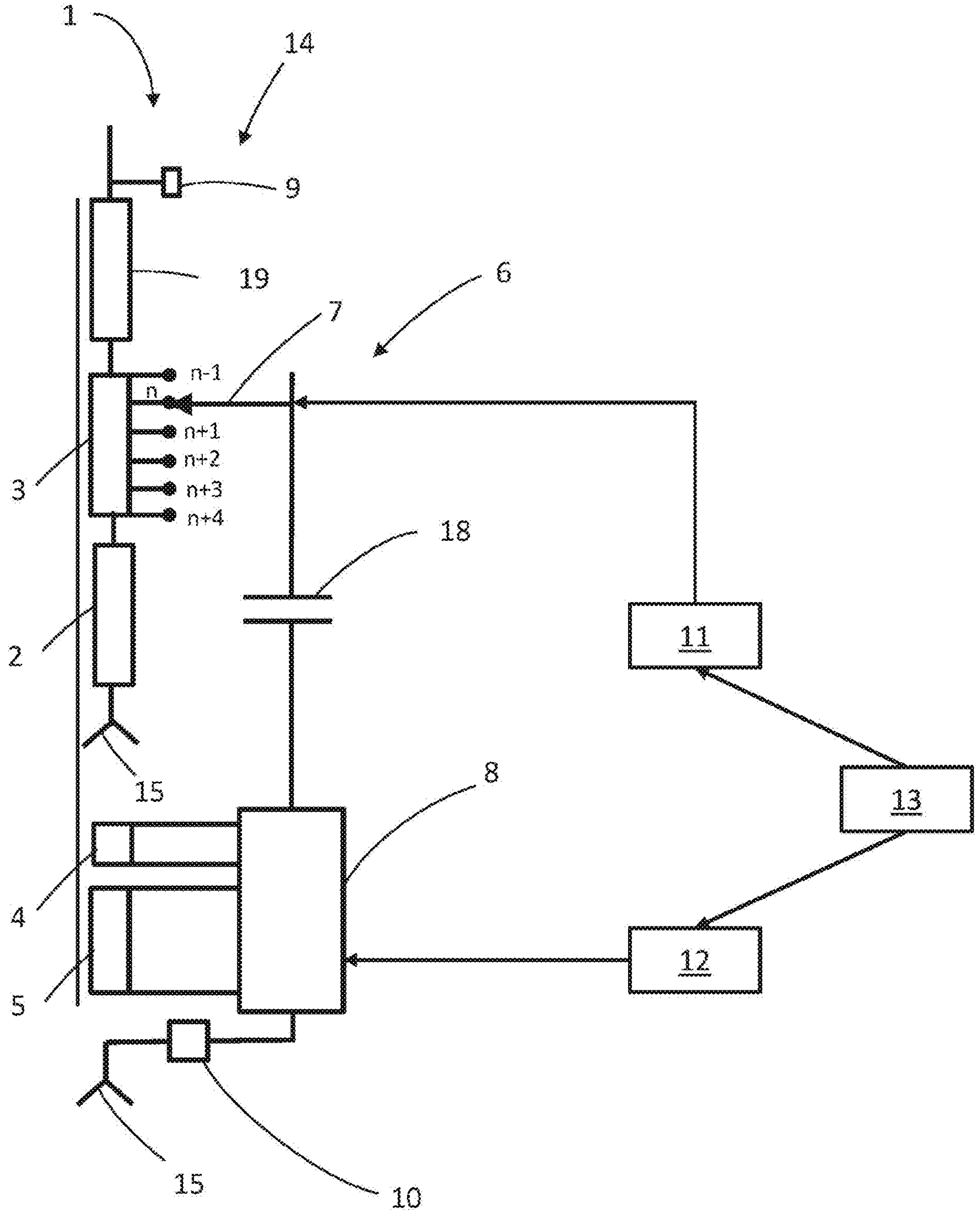
FIG. 3 shows a schematic illustration of a third embodiment of the device.

FIG. 3 schematically illustrates a third embodiment of the device 1 according to the present disclosure. With regard to the device 1 from FIG. 3, reference is analogously made to the above explanations with respect to the device from FIGS. 1 and 2, and only the differences are discussed below.

FIG. 3 shows a device 1 for changing the transformation ratio of an item of electrical equipment 14, which is designed here as a regulated transformer 14 having a switched-in capacitor 18. The device 1 according to this embodiment is used to regulate the infeed of capacitive reactive power into the network. The regulated transformer 14 may comprise for example a series winding 19, a tap winding 3 and a main winding 2 having a load take-off lead 15. The capacitor 18 is arranged between the first module 7 and the second module 8 of the tap changer 6.

Figure 4:
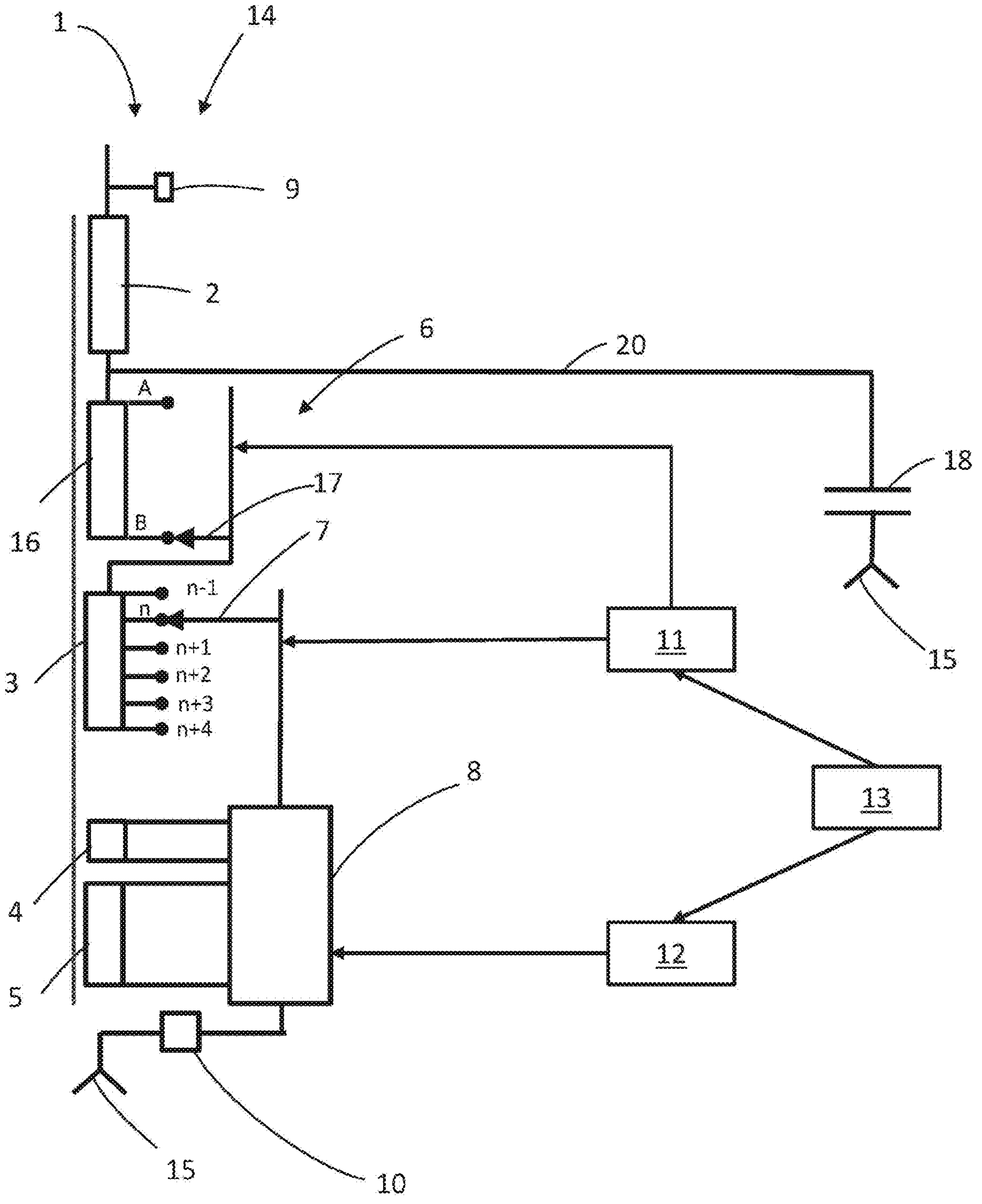
FIG. 4 shows a schematic illustration of a fourth embodiment of the device.

FIG. 4 schematically illustrates a fourth embodiment of the device 1 according to the present disclosure, which, like FIG. 3, shows a device 1 for changing the transformation ratio of an item of electrical equipment 14, which is designed as a regulated transformer 14 having a switched-in capacitor 18. Therefore, in this case too, reference is analogously made to the above explanations with respect to the device from FIGS. 1, 2 and 3, and only the differences are discussed below.

In this embodiment, the regulated transformer 14 comprises a main winding 2, a tap winding 3 having n winding taps, two partial windings 4 and 5 and an additional coarse winding 16 having a coarse tap regulator 17. A capacitor 18 for controlling the infeed of capacitive reactive power into the energy supply network is arranged in an electrical line 20 that branches off between the main winding 2 and the coarse winding 16 and ends in a load take-off lead 15.

Figure 5:
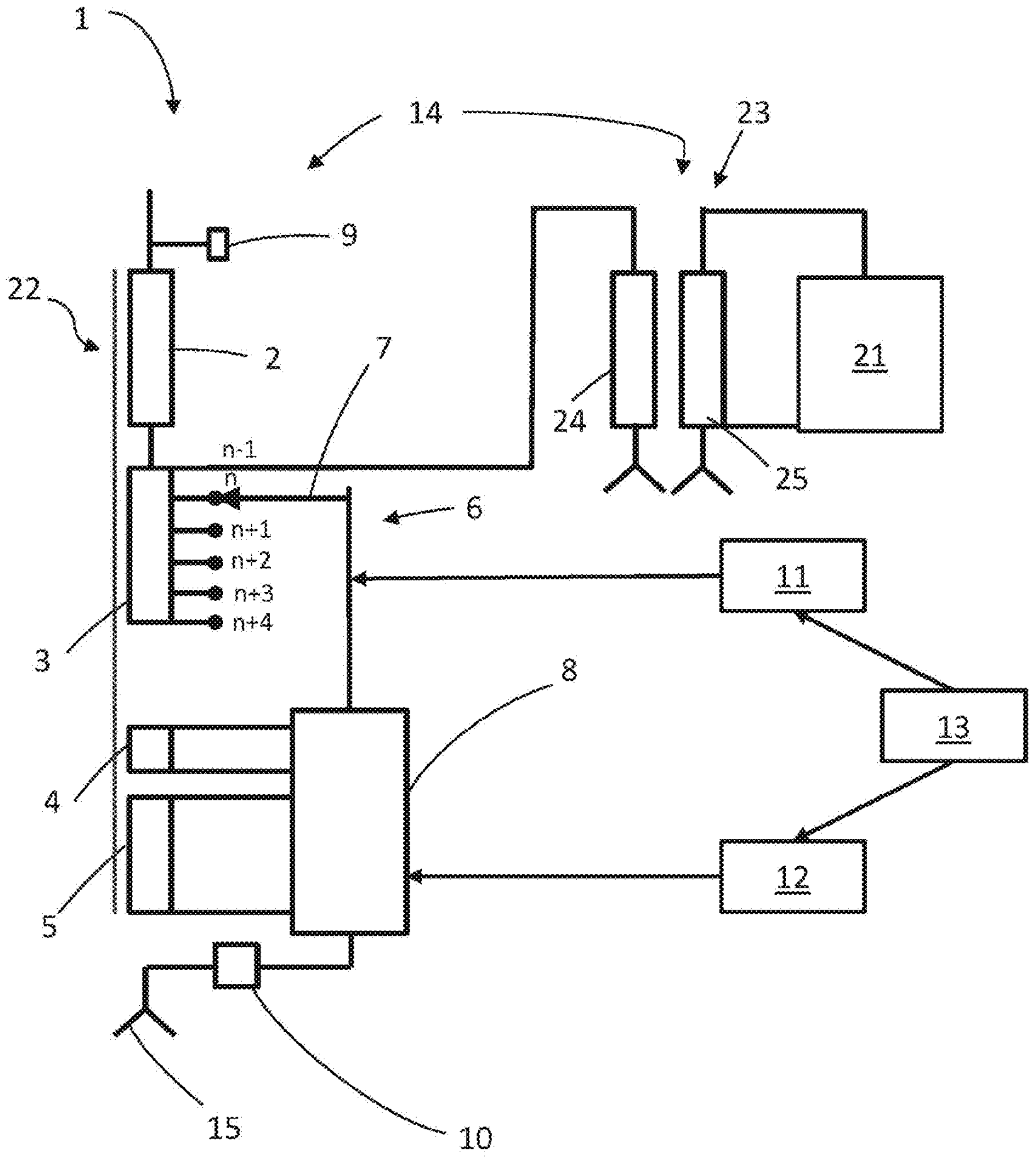
FIG. 5 shows a schematic illustration of a fifth embodiment of the device.

FIG. 5 schematically illustrates a fifth embodiment of the device 1 according to the present disclosure. With regard to the device 1 from FIG. 5, reference is analogously made to the above explanations with respect to the device from FIGS. 1, 2, 3 and 4, and only the differences are discussed below.

FIG. 5 shows a device 1 for changing the voltage, used for excitation, of an item of electrical equipment 14, said device being used for example in electric arc furnace applications. The item of electrical equipment 14 consists here of a first inductive arrangement 22, which is designed as an excitation transformer, and a second inductive arrangement 23, which is designed as a booster transformer. The excitation transformer 22 comprises a main winding 2, a tap winding 3 having n winding taps and two partial windings 4 and 5. The booster transformer 23 has a primary winding 24 and a secondary winding 25, wherein an electric arc furnace 21 is arranged on the secondary side. The tap winding 3 of the excitation transformer 22 is electrically conductively connected to the primary winding 24 of the booster transformer 23. In this embodiment, the tap changer 6 is used to regulate the voltage of the excitation transformer 22, said voltage being used to excite the booster transformer 23. Depending on whether regulation is carried out in the steady-state range or in the dynamic range, the first module 7 or the second module 8 is used.

Figure 6:
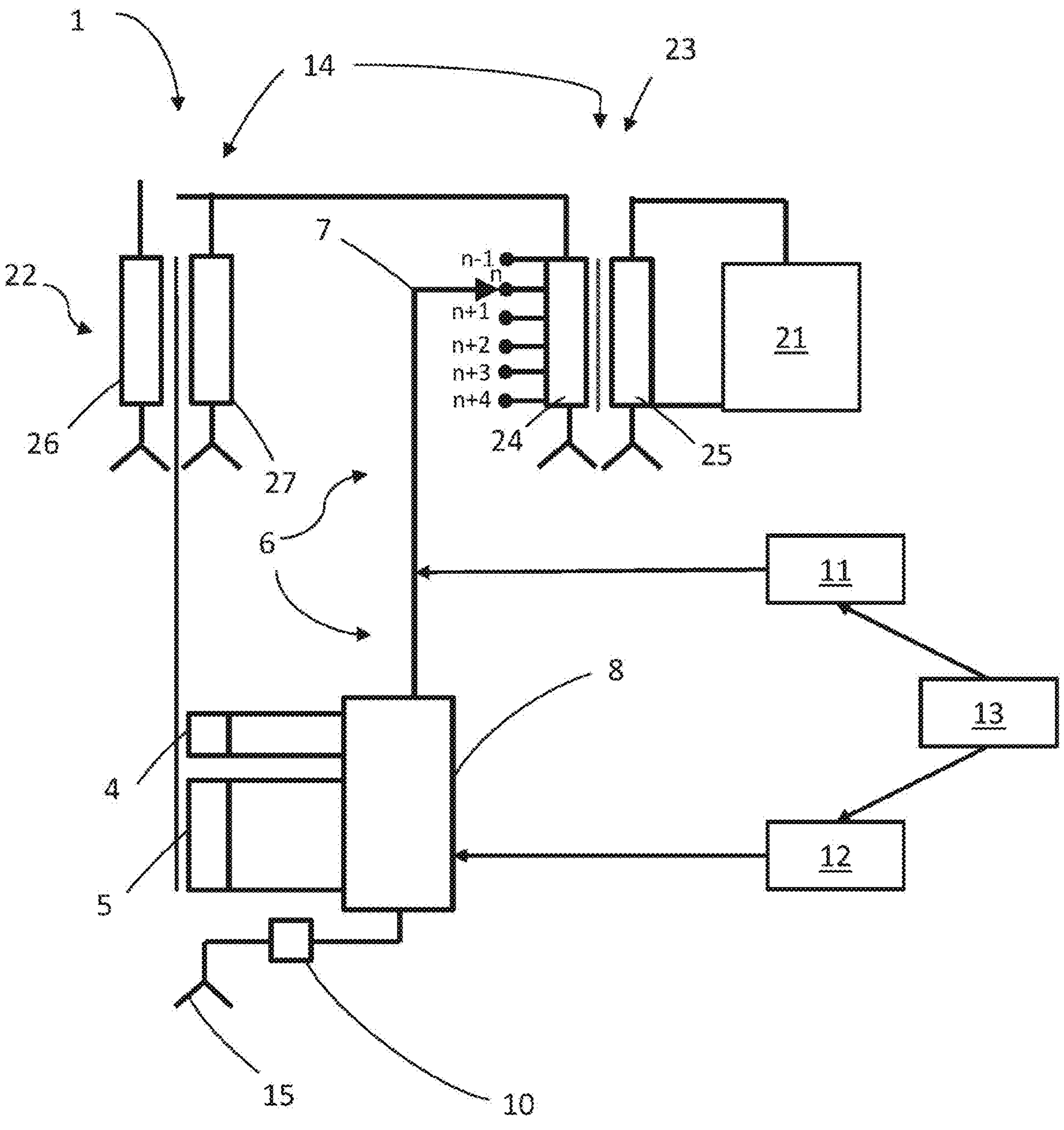
FIG. 6 shows a schematic illustration of a sixth embodiment of the device.

FIG. 6 schematically illustrates a sixth embodiment of the device 1 according to the present disclosure. With regard to the device 1 from FIG. 6, reference is analogously made to the above explanations with respect to the device from FIGS. 1, 2, 3, 4 and 5, and only the differences are discussed below.

FIG. 6 shows a further device 1 for changing the voltage, used for excitation, of an item of electrical equipment 14, said device being used for example in electric arc furnace applications. In this case too, the item of electrical equipment 14 consists of a first inductive arrangement 22, which is designed as an excitation transformer, and a second inductive arrangement 23, which is designed as a booster transformer. In this embodiment, the excitation transformer 22 has a primary winding 26 and a secondary winding 27, and the booster transformer 23 has a tap winding 24 on the primary side. The secondary winding 27 of the excitation transformer 22 is electrically conductively connected to the tap winding 24 or to the primary side of the booster transformer 23. On the tap winding 24 of the booster transformer 23, the voltage excited in the booster transformer 23 by the excitation transformer 22 is regulated by way of the tap changer 6.

Figure 7:
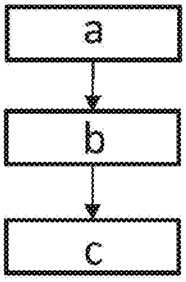
FIG. 7 shows one preferred embodiment of a method according to the improved concept.

FIG. 7 shows a flowchart of one advantageous embodiment of a method according to the improved concept. The method is performed using a device according to one of the embodiments as have already been explained in connection with FIGS. 1 to 6. In a step a, a request is received to change the transformation ratio, the impedance or the voltage, used for excitation, of an item of electrical equipment 14. This request may be received from a superordinate system, for example from a control center of an energy supply network operator, or from a local controller, such as for example a voltage regulator. In a step b, at least one relevant parameter is then checked and, in a step c, the transformation ratio, the impedance or the voltage, used for excitation, of the item of electrical equipment 14 is changed by way of the first module 7 or the second module 8 of the tap changer 6 depending on the check of the at least one relevant parameter.

Steps b and c are performed by way of the evaluation unit 13, which activates either the first control unit 11 or the second control unit 12 depending on the check carried out in step b.

Various relevant parameters may be checked in step b. By way of example, the relevant parameter may be an absolute value of a deviation of an actual voltage of the item of electrical equipment 14 from a predefined desired voltage. For this purpose, the actual voltage or the item of equipment voltage is measured by way of the voltage sensor 9, and the measured value is compared with the predefined desired voltage by way of the evaluation unit 13. In this case, the transformation ratio is changed by way of the second module 8 when the absolute value of the deviation from the desired voltage is greater than a step voltage present between two adjacent winding taps of the tap winding 3, for example between n and n+1. Another example of a relevant parameter that may be checked is an absolute value of a deviation of an impedance of the item of electrical equipment 14 from a predefined desired impedance. For this purpose, the impedance of the item of electrical equipment 14 is determined based on current values measured using the current sensor 10, and the determined value is compared with a predefined desired impedance by way of the evaluation unit 13. The impedance is then changed by way of the second module 8 when the absolute value of the deviation from the desired impedance is greater than an impedance acting between two adjacent winding taps n, n+1 of the tap winding 3. Further examples of relevant parameters are the gradient of a required voltage change, the gradient of a required impedance change or the absolute value of a deviation of an actual voltage in a first inductive arrangement 22 for exciting a second inductive arrangement 23 from a predefined desired voltage.

If the transformation ratio, the impedance or the voltage used for excitation is changed by way of the second module 8, according to one advantageous implementation of the method, the first module 7 and the second module 8 are then actuated alternately until the first module 7 has reached a position indicating a new, static operating point of an energy supply network or of a process-driven system, and the second module 8 is in a neutral position in which the partial windings 4 and 5 are bridged, that is to say are at potential but do not carry a current.

In other words, following switching of the second module 8, the first module 7 is gradually "tightened". By way of example, if the second module 8 switches two steps up (+2) from the neutral position (0), in a next step, the first module 7 switches one step up (+1) and the second module switches one step back down (−1). In a subsequent step, the first module 7 switches one step up (+1) again and the second module 8 switches one step down (−1) again. Ultimately, the first module 7 is two steps higher than before and the second module 8 is back in its neutral position. The described "tightening" of the first module 7 means that the first module 7 has set a new, static operating point. Starting from the neutral position, the full regulating range up and down is available again for the second module 8.

Figure 8:
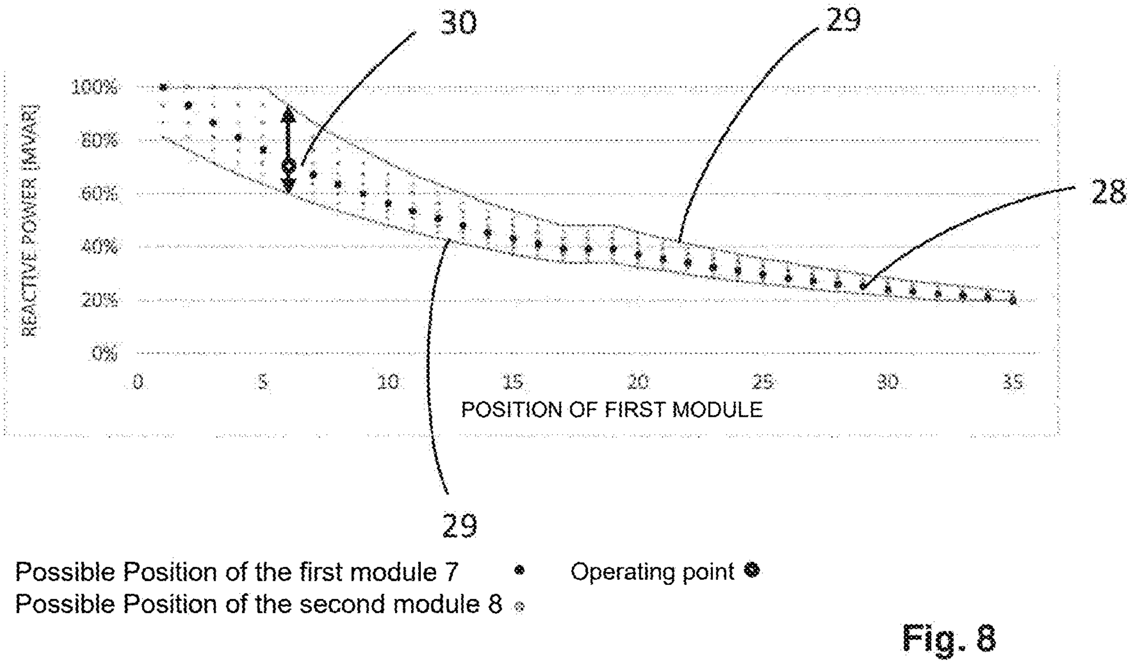
FIG. 8 shows a regulating range of a tap changer in a device according to one embodiment of the method according to the improved concept.

FIG. 8 schematically illustrates that described above with respect to a changeable impedance. The regulating range of a tap changer 6, more precisely the reactive power regulating range, is shown here. The percentage of the reactive power of the item of inductive equipment 14 is plotted on the y-axis. The position of the first module 7 of the tap changer 6, that is to say which winding tap n of the tap winding 3 is contacted by the first module 7 of the tap changer 6, may be read off on the x-axis. The points 28 in this case mark the possible positions that the first module 7 is able to adopt, the regulation taking place in the steady-state range, that is to say in cycles of one minute. The point 30 represents the static operating point that is set via the first module 7 according to this embodiment. The region extending vertically upwards and downwards from the points 28 and 30 and delimited by the lines 29 is the regulating range covered by the second module 8. In this range delimited by the lines 29, the regulation is carried out quickly, namely in the millisecond range, by way of the second module 8, and in both directions, such that it is possible to react flexibly and quickly to dynamic fluctuations in the network or in an installation. The fast but also cost-intensive semiconductor switching elements thus do not have to be dimensioned for the entire regulating range of the tap changer 6, but only for the range for which regulation has to be carried out quickly.

Figure 9:
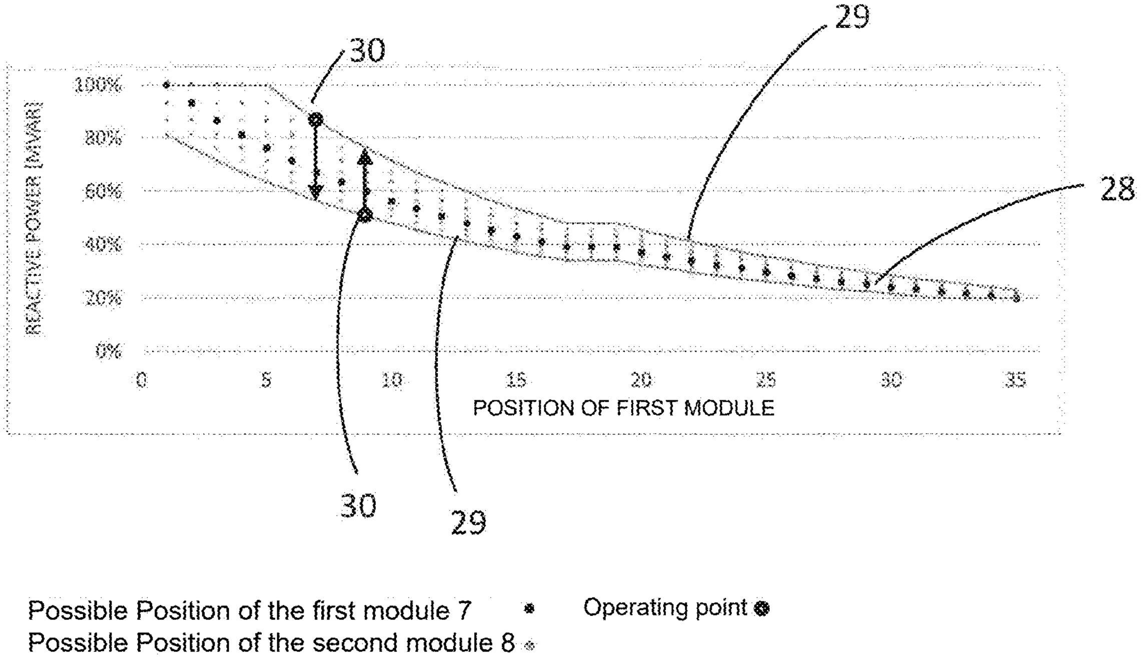
FIG. 9 shows a further regulating range of a tap changer in a device according to a further embodiment of the method according to the improved concept.

FIG. 9 schematically illustrates a further regulating range of a tap changer 6, more precisely the reactive power regulating range according to a further embodiment of the method. According to this embodiment, following a change in the transformation ratio, the impedance or the voltage used for excitation by way of the second module 8, the first module 7 and the second module 8 are actuated such that the second module 8 adopts a first end position in which the turns of the partial windings 4 and 5 are either both added to the tap winding 3 or subtracted therefrom. In this embodiment, the respective end position represents the operating point 30. Depending on which case applies, the entire dynamic regulating range of the second module 8 is available, starting from the operating point 30, in one direction, namely from the first end position to the second end position or vice versa. This implementation is advantageous for certain network requirements that require a rapid reaction of the tap changer 6 in one direction.

The combination of a conventional on-load tap changer, a first module, with a power-electronics tap changer, a second module, makes it possible to achieve a large regulating range while at the same time achieving an inexpensive and space-saving arrangement at high potential. This is because the second module, which is more cost-intensive compared to the first module, for rapid regulation in the dynamic regulating range is able to be designed in a manner optimized for the respective application. Consequently, the second module may accordingly be designed only for that part of the regulation for which the power-electronics-based second module offers an advantage due to its switching speed. In addition, the combined solution is significantly more space-saving than a purely power-electronics-based solution. In summary, the solution according to the present disclosure makes it possible to achieve a high degree of flexibility with comparatively small space requirements for network management and furnace operation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 device
2 main winding
3 tap winding
4 first partial winding
5 second partial winding
6 tap changer
7 first module of 6
8 second module of 6
9 voltage sensor
10 current sensor
11 first control unit
12 second control unit
13 evaluation unit
14 item of electrical equipment
15 load take-off lead
16 coarse winding
17 coarse tap regulator
18 capacitor
19 series winding
20 electrical line
21 electric arc furnace
22 first inductive arrangement
23 second inductive arrangement
24 primary winding or tap winding of 23
25 secondary winding of 23
26 primary winding of 22
27 secondary winding of 22
28 points
29 lines
A first end of 16
B second end of 16
n−1, n, . . . n+4 winding taps

The invention claimed is:

1. A method for changing a transformation ratio, an impedance, or a voltage, used for excitation, of an item of electrical equipment, the item of electrical equipment comprising:

at least one tap winding comprising winding taps, and at least one partial winding; and a tap changer configured to change the transformation ratio, the impedance, or the voltage, used for excitation, of the item of electrical equipment, wherein:

the tap changer comprises a first module configured to connect the winding taps of the tap winding to one another; and a second module comprising semiconductor switching elements configured for the switching-in, switching-out or bypassing of the at least one partial winding, the method comprising:

receiving a request to change the transformation ratio, the impedance, or the voltage, used for excitation, of the item of electrical equipment;

checking at least one relevant parameter; and changing the transformation ratio, the impedance, or the voltage, used for excitation, of the item of electrical equipment either by way of the first module or by way of the second module depending on the check of the at least one relevant parameter.

2. The method as claimed in claim 1, wherein;

the relevant parameter comprises an absolute value of a deviation of an actual voltage of the item of electrical equipment from a predefined desired voltage, and the transformation ratio is changed by way of the second module based upon determining that the absolute value of the deviation from the desired voltage is greater than a step voltage present between two adjacent winding taps of the tap winding.

3. The method as claimed in claim 1, wherein:

the relevant parameter comprises an absolute value of a deviation of an impedance of the item of electrical equipment from a predefined desired impedance, and the impedance is changed by way of the second module based upon determining that the absolute value of the deviation from the desired impedance is greater than an impedance acting between two adjacent winding taps of the tap winding.

4. The method as claimed in claim 1, wherein:

the relevant parameter comprises an absolute value of a deviation of an actual voltage in a first inductive arrangement for exciting a second inductive arrangement from a predefined desired voltage, and the voltage, used for excitation, of the second inductive arrangement is set by way of the second module based upon determining that the absolute value of the deviation from the desired voltage is greater than a step voltage present between two adjacent winding taps of the tap winding.

5. The method as claimed in claim 1, wherein:

the relevant parameter comprises the gradient of a required voltage change, and the transformation ratio is changed by way of the second module based upon determining that the gradient of the required voltage change is greater than a defined limit value.

6. The method as claimed in claim 1, wherein:

the relevant parameter comprises the gradient of a required impedance change, and the impedance is changed by way of the second module based upon determining that the gradient of the required impedance change is greater than a defined limit value.

7. The method as claimed in claim 1, wherein;

the relevant parameter comprises a fundamental plus a harmonic content of a voltage present at the item of electrical equipment, and the transformation ratio is changed by way of the second module based upon determining that the harmonic content is greater than a defined limit value.

8. The method as claimed in claim 7, wherein;

the method further comprises performing a Fourier analysis to determine the harmonic content above the fundamental of the voltage present at the item of electrical equipment.

9. The method as claimed in claim 1, wherein the method further comprises:

following a change in the transformation ratio, the impedance, or the voltage used for excitation by way of the second module, actuating the first module and the second module such that the second module adopts a neutral position in which the at least one partial winding is bridged.

10. The method as claimed in claim 1, wherein the method further comprises:

following a change in the transformation ratio, the impedance, or the voltage used for excitation by way of the second module, actuating the first module and the second module such that the second module adopts a first end position from which the entire regulating range of the second module is available to a second end position.

11. The method as claimed in claim 1, wherein:

multiple relevant parameters are checked, the parameters are weighted with regard to their relevance, the transformation ratio, the impedance, or the voltage used for excitation are changed either by way of the first module or by way of the second module depending on the check and the weighting of the relevant parameters.

12. The method as claimed in claim 1, wherein:

the first module and the second module are not actuated at the same time.

13. A device for changing a transformation ratio, an impedance, or a voltage, used for excitation, of an item of electrical equipment, the item of electrical equipment comprising at least one tap winding comprising winding taps, at least one partial winding, and a tap changer configured for changing the transformation ratio, the impedance, or the voltage, used for excitation, of the item of electrical equipment, the device comprising:

at least one sensor configured to measure a voltage present at a suitable measuring point, and/or at least one sensor configured to measure a current flowing at a suitable measuring point, and an evaluation unit, which is designed to carry out the method as claimed in claim 1.

14. The device as claimed in claim 13, wherein;

the tap changer comprises a first module configured to connect the winding taps of the tap winding to one another; and a second module comprising semiconductor switching elements for the switching-in, switching-out or bypassing of the at least one partial winding, the first module comprises a first control unit, and the second module comprises a second control unit, and wherein:

the evaluation unit is designed to actuate the first control unit and the second control unit.

* * * * *